United States Patent [19]

Hagman et al.

[11] Patent Number: 5,567,772

[45] Date of Patent: Oct. 22, 1996

[54] HIGH FLOW IONOMER RESIN COMPOSITIONS USEFUL FOR GOLF BALL COVERS

[75] Inventors: John F. Hagman, Wilmington, Del.; Robert J. Statz, Kennett Square, Pa.

[73] Assignee: E. I. Du Pont de Nemours and Company, Wilmington, Del.

[21] Appl. No.: 365,255

[22] Filed: Dec. 28, 1994

Related U.S. Application Data

[63] Continuation-in-part of Ser. No. 206,358, Mar. 7, 1994, abandoned.

[51] Int. Cl.$^6$ .............................. C08L 33/02; C08L 23/26; C08L 23/08; A63B 37/12
[52] U.S. Cl. ...................... 525/221; 525/330.2; 525/196; 524/522; 473/378
[58] Field of Search .............................. 525/330.2, 221, 525/196; 273/235 R

[56] References Cited

U.S. PATENT DOCUMENTS

| | | | |
|---|---|---|---|
| 4,690,981 | 9/1987 | Statz . | |
| 4,774,290 | 9/1988 | Neill et al. | 525/196 |
| 5,210,142 | 5/1993 | Kale et al. . | |
| 5,244,969 | 9/1993 | Yamada | 524/908 |
| 5,250,612 | 10/1993 | Hazlitt et al. . | |

FOREIGN PATENT DOCUMENTS 2267908  12/1993  United Kingdom .

*Primary Examiner*—Carman J. Seccuro, Jr.
*Attorney, Agent, or Firm*—Peter A. Fowell

[57] ABSTRACT

Ionomer resins made by neutralizing acid copolymers with a high melt index, corresponding to a relatively low molecular weight, but which have been relatively highly neutralized, can be used, either alone or in blends with other ionomers, as materials for golf ball covers, without loss of key properties for that application. The materials have better flow and better processability than conventional ionomeric materials used for golf balls.

5 Claims, No Drawings

HIGH FLOW IONOMER RESIN COMPOSITIONS USEFUL FOR GOLF BALL COVERS

CROSS REFERENCE TO RELATED APPLICATION

This Application is a Continuation-in-Part of application, Ser. No. 08/206,358, filed Mar. 2, 1994, now abandoned.

BACKGROUND OF THE INVENTION

1. Field of the Invention

This invention relates to ionomer resin compositions based on ethylene copolymers which have high melt flow. They are ideally suited for use particularly as blending resins with other ionomers, to provide ionomer blends which also have high flow, yet have good resilience and durability. The compositions are readily processed to produce covers for golf balls. The resulting balls also have good resilience, and also have good durability. More particularly, the compositions contain a certain amount of ionomer prepared from ethylene carboxylic acid copolymers with a very high melt index, neutralized to a fairly high level.

2. Description of Related Art

Ethylene (meth)acrylic acid copolymers neutralized with metal ions are known as ionic copolymers or ionomers or ionomer resins. They are well known for use as covers for golf balls. Such resins are sold by E. I. dupont de Nemours and sold under the trade name of SURLYN. The properties of the ionomer are reflected to a considerable extent in the behavior of golf balls when the ionomer is used as cover material. The resilience of the golf ball is, for instance, dependent on the resilience of the cover material, and the durability of a golf ball on repeated impact reflects the toughness of the cover material. However, to obtain good properties, the melt index (MI) of the ionomer is generally so low that poor moldability of the material can be a problem. While low MI can give good properties, the poor moldability leads to molding inconsistency, and often the best possible properties are not realized.

Ethylene copolymer ionomers are made by neutralizing the corresponding ethylene/acid copolymer with materials which supply metal ions. The process of making ionomers was first disclosed in U.S. Pat. No. 3,264,272 (Rees). Neutralization causes ionic crosslinking to occur and at use temperatures (for golf balls this means ambient temperatures), this ionic crosslinking has a major beneficial effect on certain properties. Fortunately, at higher temperatures, for instance above 160 deg. C., the crosslinks become labile and the material can become fluid enough to process as a thermoplastic melt rather than remain intractable, as covalent crosslinked materials are. The crosslinking effect caused by the ions does not completely disappear at processing temperatures however, and the melt viscosity of these ion neutralized resins is still significantly higher than the parent un-neutralized resin. As the level of neutralization increases, viscosity increases many fold, and at levels above 90%, the resin can become almost intractable. Below about 20% generally insufficient property advantage compared with the base resin is achieved. For these reasons neutralization is typically in the range of 20 to 70%.

The melt viscosity, is normally quantified by Melt Index, (MI) which is a melt flow measurement and therefore has an inverse relation to viscosity. Higher MI, within limits, generally means better processability. On the other hand, very generally, lower MI, all else being equal, gives better mechanical properties. Typically ionomers for general use have an MI between 0.1 and 25. For golf balls, where premium properties are required, lower MI of below 3 is typically required.

In many linear polymers, MI for a given polymer chain composition is often a guide to mechanical properties, because it gives a guide to the length of the polymer chains, and this determines many strength, impact and toughness properties. If however the polymer is highly branched or partially crosslinked, MI is less of a guide to either the properties or to the length of the underlying polymer molecules, because MI is also dependent on the amount of branching or crosslinking. In the case of ionomers which remain partly crosslinked at temperatures where MI is measured, and which are effectively highly crosslinked at use temperatures, MI is not a unique guide to properties even for the same ionomer chemically. The properties of ionomers depend on the underlying molecular weight of the acid copolymer before ionic crosslinking and well as on the amount of crosslinking. The MI of an ionomer of given composition does not uniquely characterize that ionomer, since the same MI can be achieved either by highly neutralizing (i.e. crosslinking) a very high MI (lower molecular weight) acid copolymer, or neutralizing to a much lower degree, a low MI (i.e. higher molecular weight) acid copolymer. The resulting ionomers are structurally very different, because the underlying molecular weight of the acid copolymer remains an integral part of the ionomer's structure, as does the level of neutralization or ionic crosslinking. Thus the MI of the acid copolymer, not just the MI of the final ionomer, represents a key measure which defines the exact nature of the ionomer. Conventional wisdom holds that, for a given property level requirement, there is a clearly defined lower limit to the molecular weight of the underlying (non-crosslinked) acid copolymer, irrespective of the amount of neutralization—hence an upper limit to the MI of the acid copolymer from which the ionomer is made. This upper limit depends on the use, and properties required. For premium uses where excellent properties are required, a lower MI limit of the starting acid copolymer is necessary.

Rees discloses that the 'base resin', i.e., the acid copolymer, may have a melt index of from 0.1 to 1000, (using ASTM D-1238 at 190 deg. C.), but preferably from 1.0 to 100. Ionomers made from acid copolymers having a very high melt index of about 400 have been used for certain adhesives and binder applications, where mechanical property requirements are not as stringent as in those used for most other applications.

Neill et at. U.S. Pat. No. 4,774,290 discloses a method of making ionomers where the acid copolymers are neutralized with metal oxides using a polyethylene carrier resin to provide more uniform dispersion and reaction of the metal oxide. Composition variables are very broad. Thus, suitable starting MI of the acid copolymer is disclosed as being anywhere from 1 to 3000, preferably from 10 to 500, and the amount of carrier polyethylene from 0.5 to 100 parts per 100 parts of acid copolymer, (i.e., 50/50 polyethylene/ionomer). Final MI of the ionomers made varied from 0.87 to 14.87. An ionomer prepared from an acid copolymer of MI about 300, with about 1.6% polyethylene carrier resin, neutralized with magnesium oxide to an MI of 4.53 is exemplified. The polyethylene is described as increasing the strength and toughness of the final ionomer, as well as reducing opacity. A composition neutralized with about 3 weight percent magnesium oxide with 3% weight percent polyethylene carrier, and unspecified final MI was described as being suitable for articles including golf ball covers. Even very low levels of polyethylene however have been found to be detrimental to certain key properties for golf ball cover material.

For pure ionomers, free from other polymers, useful for golf ball covers, the upper MI limit of the precursor acid copolymer was generally assumed by the present inventors to be about 100, and higher MI base resins were never used. Recently, Yamada, U.S. Pat. No. 5,244,969 disclosed a higher limit of 150 for the MI of the acid copolymer base resin for ionomers specifically for golf ball covers. Yamada discloses that if the MI of the acid copolymer is above 150, the rebound resilience of his compositions is poor. Such resilience is a key property required in golf ball cover material.

When ionomers were prepared from acid copolymers with MI below 100 and neutralized to an MI of from about 0.4 to about 2.8, the ionomers were ideally suited, particularly in blends, to provide golf ball cover materials which allowed the balls to have premium properties—the desired high resilience, the durability, and the other characteristics sought after in golf balls. Ionomers with MIs much above 3.0 generally gave less than desirable properties.

Unfortunately, resins with low MIs, particularly about 3 or less do not lend themselves to as efficient and rapid processing to form golf ball covers as would be liked. This imposes a cost penalty both because of slower processing, and because of inconsistency in parts when molding a resin of insufficient fluidity. Typically the result is a high number of rejects. Thus, conventional wisdom imposed a window on pure ionomer compositions suitable for golf ball covers. The limits of this window were a starting acid copolymer MI no higher than 150 and preferably less than 100, and derived ionomer MI below 3.0 for properties. It is clearly possible, when starting with an acid copolymer having an MI of less than 150 to make an ionomer with higher MI for better processing, above 3 for instance, simply by neutralizing only to a relatively low level. However, high neutralization levels are considered critical in obtaining the beneficial properties of ionomer. Thus it appeared, one was forced into the best compromise between optimum flow and optimum properties.

Many other variations in the compositions of ionomers is known, and these variations have been used to optimize particular characteristics of golf balls when the ionomer material is used as its cover. For instance, the amount of acid and which acid, and the particular ion used to neutralize, as well as the amount of neutralization, affects the nature of the ionomer. Blending ionomers also has become common in production of such cover materials. Blends may be of different ionomers having different metal ions, different ionomers having different flexural modulus, or different ionomers having different acid level and/or type. Such blending has been found to provide a certain degree of synergism with respect to key properties important for golf ball covers, particularly resilience. Use of blending is now the norm for golf ball covers. When any new technology based on new composition or process variables is found, it is therefore common, or even the norm, to combine it with the various established blending and other property optimization technologies of the past.

With regard to the present problem, the problem of poor processability, there is a need for ionomer resins for use in golf ball cover materials, to be used alone, (but preferably as part of ionomer blends, as noted above), which have more desirable processability, or impart better processability, without substantial loss of properties, and which lead to acceptable characteristics in golf balls when such materials are used as the cover, particularly durability and resilience characteristics.

SUMMARY OF THE INVENTION

The key to the invention is the discovery that those properties of ionomers which translate into durability, particularly at low temperatures, and resilience in golf balls, when the ionomers are used as cover material, are not substantially reduced when the ionomers have an MI above 3.0 provided they are made from base copolymers with an MI above about 150, and in the 150 to 350 range rather than the usual range between 60 and 100. This appears to be because it is possible to achieve higher levels of neutralization before flow becomes too low. These high levels of neutralization, surprisingly, adequately compensate for high MI, both in the starting acid copolymer, and in the resulting ionomer. Thus, unexpectedly, there is a small window of base resin MI, specifically between 150 to 350, which has not heretofore been recognized as useful for producing precisely the combination of flow and properties in the resulting ionomer, and in the performance characteristics of golf balls using that ionomer (or blends including that ionomer with other ionomers), that have been sought after.

More specifically, there is provided a composition comprising a polymer which consists of an ethylene copolymer ionomer with a melt index of from 3.0 to 8.0, which is prepared from a precursor ethylene methacrylic acid or acrylic acid copolymer having a melt index of from more than 150 up to 350, having greater than about 40 percent of the acid groups present neutralized with metal ions. The composition contain no other polymers such as polyethylene.

Further provided are ionomer blends which contain at least 25 percent of the above ionomer. The blend compositions also contain no other polymer such as polyethylene.

Minor amounts of standard additives for golf ball covers such as whiteners or colorants, antioxidants and stabilizers may be present.

DETAILED DESCRIPTION OF THE INVENTION

In this disclosure, the word 'copolymer' means a polymer polymerized from two or more monomers, and includes terpolymers. The more specific description 'ethylene carboxylic acid copolymer', 'ethylene methacrylic acid copolymer' and the like, is meant to include copolymers which may also have a third monomer present.

As noted above, ionomers derived from ethylene/carboxylic acid copolymers by partial neutralization with metal ions are materials which behave substantially as crosslinked polymers at ambient temperatures, yet whose crosslinks are sufficiently labile as temperature is increased that they can be processed as thermoplastics. The preparation of such ionomers is described in U.S. Pat. No. 3,264,272 (Rees), which is hereby incorporated by reference. Methods of making ionomers using a polyethylene carrier polymer for metal oxides have been described in Neill, U.S. Pat. No. 4,774,290. Even low levels of polyethylene detract from the properties of the materials of this invention, and this method of making ionomers is unsuitable to make the ionomers of the present invention. The precursor or 'base' resins used to prepare the ionomers, ethylene/carboxylic acid copolymers are direct copolymers, that is to say not graft copolymers, and may be prepared as described in U.S. Pat. No. 4,351,931 (Armitage), which is also hereby incorporated by reference. That reference describes polymers with up to about 10 weight percent acid. Higher levels of acid are common in the base polymers used to prepare ionomers now commonly used in golf ball cover materials. Acid levels as high as 30 weight percent have been considered, and are of importance in the present invention. Acid copolymers with high levels of acid are difficult to prepare in continuous polymerizers, because of monomer/polymer phase separation. This difficulty can be avoided, however, by use of 'cosolvent technology' as described in U.S. Pat. No. 5,028,674 which is also hereby incorporated by reference.

Like the properties of any crosslinked polymers, ionomer properties depend fundamentally on the average molecular weight of the underlying uncrosslinked polymer, and on the degree of effective crosslinking. These may be considered the 'architectural' features of a polymer, and are strongly dominant, whatever the chemical nature of the polymer. Increasing crosslinking affects a characteristic of molecular weight which affects flow, but it has virtually no effect on the underlying length of the linear precursor molecules, and this is a key factor for many mechanical properties. The resins of this invention, prepared from high MI base resins, above about 150, will be referred to, for descriptive convenience, as non-conventional architectural type ionomers resins or, for short, non-conventional ionomers (in the tables denoted as NC). Ionomer resins made from an MI base resin of below 150 will be referred to as conventional architectural type ionomer resins or, for short, conventional ionomers (in the tables denoted as C). These types of architectural features in a covalently crosslinked polymer are sometimes characterized in terms of the underlying linear polymer molecular weight and its distribution, and the crosslink density. However, these ionomers may be more readily characterized empirically, simply in terms of base resin MI, derived ionomer resin MI, and degree of neutralization or percent of acid groups neutralized. It should be recognized that the MI of the acid copolymer relates to an 13 architectural feature which remains in the resulting ionomer, that feature being the length of the polymer chains themselves. An ionomer with only its own MI specified (i.e. without the MI of the precursor resin) is not a narrowly defined composition, and in fact includes may possible architecturally different compositions. For a chemically defined acid copolymer, and neutralizing ion, an ionomer becomes narrowly defined when the final ionomer MI, the starting MI, and the degree of neutralization are all specified. In commercial data sheets on ionomers, while the final MI is always given, and often the neutralizing metal, occasionally the level of neutralization, the starting MI of the acid copolymer is generally never referred to.

The other major factor which affects properties is the chemical nature of the chain and of the crosslinks. In the case of ionomers the chemical nature of the chain depends on the amount of acid comonomer and type, the amount of any other comonomer (such as 'softening' comonomers which lower modulus) and type, and the particular metal ions which form the crosslinks.

The major thrust in varying and optimizing ionomer properties, particularly for use in golf ball cover materials, has been concerned with varying the chemical nature, namely the amount and type of acid, use of additional softening comonomers, particularly alkyl acrylates, and the nature and amount of ions in the composition. Most particularly, various synergisms or pseudo-synergisms have been found or are purported to occur, when mixes of ionomers of these various chemical types are utilized. The patent literature is replete with such disclosures.

By contrast, although the amount of crosslinking, corresponding to different amounts of neutralization, has been varied, the most sacrosanct of the architectural features of polymers, the molecular weight of the underlying equivalent linear chains, has not been varied or examined to any degree. As a result, the MI of the underlying precursor acid copolymer, which is a measure of molecular weight, and therefore the length of the polymer chains, has always been kept below about 150 when the derived ionomer is to be used in applications where premium properties are necessary. In no application are premium properties more essential than that of golf ball covers. Even when the chemical nature of the underlying polymer chain varies, i.e. the amount and type of acid and other comonomers, the rule has been to use precursor polymers with an MI of 150 or less, and generally in the 60 to 100 range. Conventional wisdom, unfortunately based on limited experimentation, indicated that polymers made using acid copolymers with greater than 150 MI would have limited impact durability, particularly at low temperatures. Such resins might be suitable for adhesives perhaps, but not much else, and certainly not for premium uses such as golf ball covers.

Surprisingly, it has now been found that high MI precursor polymer, within limits, can be used to obtain higher flow ionomers (or used with conventional ionomers to make high flow ionomer blends) without sacrificing those properties essential to allow use of the material for golf ball covers. In effect this means that, surprisingly, one can reduce underlying polymer chain length provided there is an increase in crosslinking. While some properties may be adversely affected by this change, overall, no deficiencies have been noted which are critical for translation into golf ball covers having good characteristics, and in some cases a minor improvement is seen.

The ionomers of this invention may be prepared from ethylene methacrylic acid or ethylene acrylic acid copolymers containing from 10 to 30 weight percent acid. They base copolymer and resultant ionomer may also contain a 'softening' monomer which may be an alkyl acrylate or methacrylate having an alkyl group with from 1 to 8, preferably 4 to 8 carbon atoms. The amount of softening monomer in such terpolymers may be up to about 40 weight percent in the base resin. Generally, the ionomers of the invention will not be 100 percent terpolymer. They may contain no terpolymer, or they may be a blend containing up to about 90 percent terpolymer.

The resins of this invention, non-conventional ionomers, may advantageously be used in blends. As previously noted, blending of ionomers has been advantageously used in the past in golf ball cover compositions. If the synergism known to exist in the properties of compositions with mixed metal ion types is to be utilized, the obvious way to do this is to mix two ionomers which have been neutralized with different ions. Another blend used is that of a 'hard' stiff ionomer, and a 'soft' more flexible ionomer which typically contains a softening comonomer such as an alkyl acrylate, in addition to the carboxylic acid comonomer. Another type of blend may be that of different acid ionomers, such as ionomers derived from acrylic and methacrylic acid. Alternately, a blend of a high acid comonomer content ionomer and a lower acid comonomer content ionomer may be advantageous. Another reason for blending is to obtain a given MI resin. It is usually easier to blend resins of known MIs in calculated amounts to obtain a required MI than to obtain that MI by adjusting neutralization level.

Ions in an ionomer tend to be labile, and ionomer blends may have the ions uniformly dispersed throughout the polymer. Blends of ionomers having different amounts and types of comonomers however are somewhat different, since unlike ions which move from position to position, comonomers are locked into the original polymer chain in which they were polymerized.

The blends of this invention may comprise blends of varying chemical-nature type as described above. The other resin or resins in a blend may be another non-conventional ionomer or a conventional ionomer. At least 25 percent of the blend however must be non-conventional ionomer. It is clear that there exists an almost endless number of variations achievable by blending. The blends of this invention however will always contain some non-conventional ionomer, whatever chemical-nature type of blending is also employed. In this way, all the advantages in properties resulting from chemical-nature type blending are combined with the flow advantage achieved by using at least 25 percent non-conventional ionomer in the composition. While one non-conventional ionomer could be used alone in golf ball covers, generally, the advantage achieved by chemical-nature type ionomer blending will be utilized. This may be achieved by using two non-conventional ionomers blended together—in which case the blend would be 100 percent non-conventional ionomer—or a conventional and non-conventional ionomer. However, while it is necessary in a blend to have least 25 percent non-conventional ionomer, it is preferred also to have less than 70 percent. Resins which are 100 percent non-conventional ionomer, even in blends which are optimum as far as mixed ions are concerned, while adequate, can show slightly poorer durability properties. In single ion compositions, conventional as well as non-conventional ionomers vary in low temperature impact durability. Sodium ionomers particularly, tend to be poorer in durability than zinc ionomers whether conventional or non-conventional.

Very generally, the percent of acid groups present which have been neutralized determines the final MI for a given starting MI. That is to say, the change in flow depends on the percent of acid groups neutralized. If there are more acid groups to start with, say for a 15 weight percent acid comonomer instead of 10 percent, more metal ions will be required to achieve the same percent neutralization of the total acid groups present. Thus a higher acid copolymer will have a higher weight percent of metal (as ions) in it than a lower acid copolymer. At first sight, it might be assumed that the amount of effective crosslinking, and hence reduction in melt flow which occurs on neutralization, would depend on the total amount of ions present irrespective of the amount of acid groups in the copolymer. However, it appears this is not so, and that the percent of acid groups present neutralized is the more important factor in determining flow. In addition, it has been found that the change in flow, for a given percent neutralization, is not particularly dependent on the particular metal ion for many metal ions, unless the ion produces a more covalent bond, such as aluminum does. Thus, the same starting resin, with the same percent of original acid groups neutralized with either sodium or zinc, produces, very nearly, the same MI ionomer. This understanding will enable one skilled in the art to achieve a particular MI from a particular base resin MI with minimal experimentation.

For golf ball covers, when hard, stiff ionomers are used, either alone or as they often are, in blends with soft ionomers, the copolymers of choice contain 15 weight percent or more acid comonomer. Earlier, ionomers with only 10 percent acid were commonly used. Even higher levels of 20 percent acid and even up to 30 percent are now of interest in obtaining premium properties. The high acid materials will contain more metal ions for a given percent of acid groups neutralized. While ionomers with lower levels of acid in the base polymer are part of the present invention, copolymers with 15 percent or more acid of preferred.

While not committing to any particular theory, it may be that the higher metal content possible in ionomers whose base resin has a high MI, particularly together with a high acid comonomer level, is partly an offsetting factor against the relatively low underlying molecular weight of the parent acid copolymer and hence of the ionomer also. It should be noted that the high flow ionomers, including blends, of this invention do not usually give superior properties to materials with poor flow unless the flow of the latter is so low that the materials are difficult to process, and produce flaws in molded parts. Rather, the properties are unexpectedly adequate, and better than would generally be obtained from high flow materials whose high flow was merely a result of a low level of neutralization. Use of high flow materials which have good properties also has a subtle 'additional advantage. When a material flows well, the inherent properties are more likely to be realized compared with a low flow, poor processing material. A low flow material which has inherently good properties may not always reflect those properties unless excessive care is taken during processing. Thus, not only do the high flow materials of this invention have adequate properties, they are likely to produce more consistent properties. Consistency as a quality can be of extreme importance.

The compositions of this invention are especially useful in molding golf ball covers. However, other applications where high flow combined with premium properties is required, can take advantage of the materials of this invention. Such applications include bowling-pin covers, certain footwear parts, and various other applications such as perfume bottle caps, extruded cord and co-extruded films.

TESTING CRITERIA AND SAMPLE PREPARATION

Melt Index, measured on the acid copolymers and on the ionomers is measured using ASTM D-1238, condition E, at 190 deg. C., using a weight of 2160 grams.

The degree of neutralization (percent of acid groups neutralized) may be measured by several techniques. Thus, infrared analysis may be employed, and the degree of neutralization calculated from the changes resulting in the absorption bands. Another method comprises the titration of a solution of the ionic copolymer with a strong base.

Tests used to determine the utility of the materials were carried out on two-piece golf balls. While some properties can be carried out on spheres made of the ionomer material itself as a guide to the inherent properties of the material, the preferred testing is carried out on balls, since for golf ball applications, the final measure is, of course, in the behavior of the ball. Two-piece ball were made, using a thermoset poly(butadiene) compound core, and molding on covers having a thickness of 60–90 mils, usually about 75 mils, using an Arburg vertical injection molding machine. Melt temperature was about 215 deg. C.

Resilience, as reflected in a measurement of the coefficient of restitution or COR, was measured by firing the ball from an air cannon at an initial velocity of 180 ft./sec. or 125 ft./sec., as measured using a speed monitoring device over a distance of 3 to 6 feet from the cannon. The ball strikes a steel plate, positioned 9 feet away from the cannon, and rebounds through the speed-monitoring device. The return velocity divided by the initial velocity is the COR. The COR values are strongly affected by the particular ion or ion blend, so that compositions can only be compared when the ion or ion mix is comparable. In preparing a ball material, the ion mix will be optimized, in addition to utilization of the high flow materials of the present invention. The desired result is that the COR of the ball, utilizing the high flow materials of the present invention are adequate, and generally comparable to those which could be obtained with comparable conventional ionomer having made from the same ion or ion mix.

Durability was also measured using an air cannon. The ball has an initial velocity of 175 fl./see, and it hits a steel plate about 2 feet away. Typically five balls were tested. The average number of hits to crack the ball is measured. The higher the number of hits to crack, the greater the durability. Any value of hits to crack above 10 is considered adequate, significant deficiency being registered by lower numbers. Values higher than 10 are considered very good increasing to excellent. Measurements were made at ambient temperatures and also at −20 deg. F. Durability, particularly low temperature durability, while somewhat dependent on ion mix and other factors, is strongly affected by MI. Thus durability can decrease dramatically with increasing MI. It is of great concern therefore, that durability be adequate when the present invention is utilized, since the invention is intimately concerned with MI manipulation. Ambient temperature durability is usually adequate down to low MI. Low temperature durability is usually poorer, and represents the most important determinant of suitability of materials of the invention.

Various other properties such as PGA compression, and hardness were also measured to ascertain that there was no deficiency in these properties. For ionomers with comparable ion mix these properties showed little variation, and did not appear to be significantly dependent on whether conventional or non-conventional ionomer was used, and very little dependent on MI at all.

EXAMPLES

In the following examples, the ionomers used are listed in Table 1, which lists the base resin MI, the final MI of the ionomer, and the degree of neutralization.

Table 2 shows examples of the compositions of the invention and some comparative examples. Examples falling within the bounds of the invention are shown with an example number without a 'c' suffix. Comparative examples are shown with a 'c' suffix. All examples have an MI above 3.0, as required, and have good processibility. Comparative example 6c also has an MI above 3.0, but has no non-conventional resin component. Of the examples, 1, 2, 3, 4, 5, 8 and 9 are one hundred percent non-conventional resin, examples 1, 2 and 3 being single resins, the remainder blends of non-conventional resins. Examples 6 and 7 have fifty percent non-conventional resin, and thus fall within the bounds of the invention.

The particular metal ion or metal ion blend used can have a strong effect on COR and durability. Therefore, in comparing results, it is necessary to compare results for a particular metal or metal blend composition. The table has been separated with dotted lines for easier comparison in this regard. The first set of results are for single ionomer compositions and these are separated by a solid line from blend ionomer compositions.

COR values.

COR values of 2-piece balls with non-blended ionomer resin covers, either at 125 or 180 ft/sec are slightly lower than for blended ionomer covers, which contain two different-ion ionomers. This is to be expected, since blending ionomers with different metal ions is well known to improve resilience. The difference is much greater when measured on spheres of the ionomer itself, but in covered balls, the difference is relatively small.

The important thing to note is that for a given ion or ion blend (compare results within two dotted lines), golf balls with high flow, non-conventional ionomer, or non-conventional ionomer blend covers, have resilience comparable with that of balls using conventional ionomer covers. There is some scatter in results, but on average values are as good for compositions of the invention. In some cases, for instance, the Na and the Na/Zn ionomer blends, the COR measured at both speeds appears to be slightly better on average for the compositions of the invention. For the Li and Li/Na blends, compositions of the invention are just slightly poorer. Overall however, there is no significant loss, and sometimes a gain in COR when high flowing superior processing ionomers materials of the present invention are compared with conventional ionomer cover materials.

In a separate experiment carried out at a different time, composition 4 was prepared again, and compared with an identical composition except for the presence of 1% linear low density polyethylene. COR values were measured. At 125 feet per second, COR dropped from 0.784 to 0.772 when polyethylene was present. At 180 feet per minute the value dropped from 0.724 to 0.712. While COR values for the pure ionomer composition are not quite the same as for the values for composition 4 in the table, possibly due either to minor changes in preparative conditions, or test conditions when carried out at different times, the drop in COR with polyethylene present is regarded as significant. Even though the values are still acceptable values, the drop in this critical property, measured in a side-by-side test,—a property which is always optimized—indicates the presence of polyethylene in such compositions is undesirable.

Durability

Again, comparison should be made for rows between dotted lines, so as to compare compositions with the same ion composition, this being a major factor in determining properties.

Durability tests at ambient temperatures demonstrate that values for balls using cover materials of the invention are generally adequate. All balls show values of 10 or more hits to break, which is regarded as adequate. Durability appears to show a much wider variation than COR. The best values are generally for sodium/zinc blends, and the poorer ones for lithium ionomer or lithium ionomer blend covers, both with sodium and zinc (examples 3, 8 and 9). With the exception of lithium and lithium blend ionomer covers, values are at least as good for covers using the materials of the invention to those using conventional material.

Durability at −20 deg. F. is more critical in that it is likely to be more marginal. Again, values above 10 are regarded as adequate.. Again, for sodium zinc ionomer blend covered balls, values tend to be highest. Comparative example 6c, which uses a high flow material made from conventional ionomers only, is severely deficient, as is comparative example 8c which uses lithium in its blend. All blend ionomer covers provide adequate low temperature durability for the ball. For non blended ionomer covers, high flow non-conventional lithium ionomer actually shows a much higher value that conventional material (compare example 3 and comparative example 3c).

High flow sodium ionomer cover (example 1) does however show some deficiency, giving a value of 3. While this might be an aberrant result, as noted previously, and as can be seen from example 1c, sodium ionomers are generally poorer in low temperature durability than zinc ionomers. In addition, this example, together with example 6c have the highest MI of all compositions (4.4 and 4.7 respectively). It is clear that when high flow is attempted with conventional ionomer, even with the advantage of a metal ion blend, (i.e. example 6c), low temperature durability is rather poor. When these high flow compositions are compared, one an example and one a comparative example, both are similar in COR.

When low temperature durability is compared in the other ion or ion blend categories (again compare values between dotted lines), values are adequate (above 10) or even better in some cases than compositions outside the invention. In the Zn/Na blend category for instance, all compositions of the invention (4 to 7) are on average' better than those outside (4c, 5c, 6c).

Overall materials of the invention containing non-conventional ionomer, provide at least as good ball properties as, and sometimes better than, conventional ionomers.

TABLE 1

IONOMER RESIN COMPOSITIONS

| Code | MI Base Resin | Ionomer | Metal | % Acid groups Neutralized |
|---|---|---|---|---|
| C1  | 25  | 2.5 (2.7) | Na | ~29 |
| C2  | 60  | 4.2 (4.0) | Na | ~33 |
| C3  | 60  | 1.2 (0.9) | Na | ~59 |
| C4  | 60  | 5.7 (4.5) | Zn | ~35 |
| C5  | 60  | 0.9 (0.6) | Zn | ~58 |
| C6  | 60  | 2.8       | Li | ~47 |
| NC1 | 213 | 4.4       | Na | ~51 |
| NC2 | 213 | 3.4       | Zn | ~56 |
| NC3 | 175 | 4.3 (4.6) | Zn | ~51 |
| NC4 | 175 | 3.3 (3.6) | Zn | ~58 |
| NC5 | 237 | 4.5 (4.7) | Zn | ~58 |
| NC6 | 213 | 3.8       | Li | ~47 |

All compositions have a base resin of ethylene/methacrylic acid with 15 weight percent methacrylic acid.
C code refers to conventional ionomers. NC code refers to non-conventional ionomers.
MI values in parenthesis were measured on the same resin in a different laboratory.

TABLE 2

BEHAVIOR OF 2-PIECE GOLF BALLS WITH IONOMER COVERS

| Ex # | Composition (of ionomer cover) | | COR 180 | COR 125 | MI (ionomer) | DURABILITY RT (Hits to Break) | DURABILITY −20 (Hits to Break) |
|---|---|---|---|---|---|---|---|
| | | | Non-blended compositions | | | | |
| 1c | C3      | (Na)    | .705 | .774 | 1.2  | 30 | 16 |
| 1  | NC1     | (Na)    | .711 | .776 | 4.4  | 30 | 3  |
| 2c | C5      | (Zn)    | .703 | .772 | 0.9  | 34 | 23 |
| 2  | NC2     | (Zn)    | .702 | .770 | 3.4  | 36 | 22 |
| 3c | C6      | (Li)    | .717 | .781 | 2.8  | 54 | 8  |
| 3  | NC6     | (Li)    | .709 | .777 | 3.8  | 27 | 33 |
| | | | Blended ionomer compostions | | | | |
| 4c | C3/C5   | (Na/Zn) | .713 | .779 | 0.9  | 20 | 22 |
| 5c | C1/C5   | (Na/Zn) | .715 | .780 | 1.6  | 52 | 41 |
| 6c | C1/C4   | (Na/Zn) | .711 | .780 | 4.7  | 59 | 2  |
| 4  | NC1/NC2 | (Na/Zn) | .712 | .781 | 3.7  | 39 | 33 |
| 5  | NC1/NC2 | (Na/Zn) | .708 | .777 | 3.8e | 37 | 29 |
| 6  | C1/NC4  | (Na/Zn) | .719 | .782 | 3.8  | 73 | 43 |
| 7  | C1/NC5  | (Na/Zn) | .784 | 4.2  | 69   | 42 |    |
| 7c | C6/C5   | (Li/Zn) | .714 | .779 | 1.5  | 30 | 28 |
| 8  | NC6/NC2 | (Li/Zn) | .714 | .780 | 3.4  | 14 | 17 |
| 8c | C6/C1   | (Li/Na) | .716 | .781 | 2.9  | 47 | 1  |
| 9  | NC6/NC1 | (Li/Na) | .711 | .777 | 3.7  | 10 | 13 | e = estimate
COR 180 and COR 125 are Coefficient of Restitution at 180 and 125 feet/second.
Durability RT measured at Room Temperature and Durability/−20 measured at −20 deg. F. (−29 deg. C.),
All blends are 50/50 except example 5 which is a 70/30 blend.

We claim:

1. An ionomer composition, comprising a polymer, the polymer in the composition consisting essentially of;

an ethylene/acid copolymer ionomer which is a partially neutralized copolymer of ethylene and methacrylic acid or acrylic acid, optionally containing a softening monomer, the acid copolymer before neutralization having a melt index of from about 160 to about 250, at least 40 percent of the acid groups present neutralized, to form the ionomer, the ionomer having an MI of 3.0 to 8.0.

2. The ionomer composition of claim 1 wherein the ethylene/methacrylic acid or ethylene/acrylic acid copolymer is a terpolymer.

3. A blend composition, comprising:

a polymer blend consisting of more than one ionomer, wherein at least 25 weight percent of the blend composition is the ionomer composition of claim 1.

4. The composition of claim 1, 2 or 3, further comprising minor amounts of whiteners, colorants, antioxidants or stabilizers.

5. A golf ball having a core and a cover, the cover comprising the ionomer composition of claim 4.

* * * * *